April 9, 1963 J. P. PISTILLO 3,084,566
STEERING DEVICE
Filed April 1, 1960 3 Sheets-Sheet 1

INVENTOR.
JOHN P. PISTILLO
BY
Fay & Fay
ATTORNEYS

April 9, 1963  J. P. PISTILLO  3,084,566
STEERING DEVICE
Filed April 1, 1960  3 Sheets-Sheet 2

INVENTOR.
JOHN P. PISTILLO
BY
*Fay & Fay*
ATTORNEYS

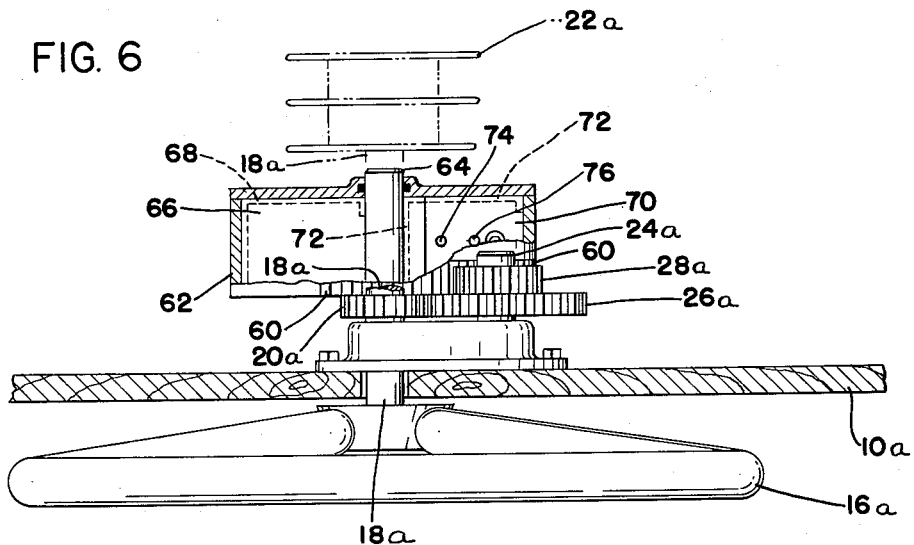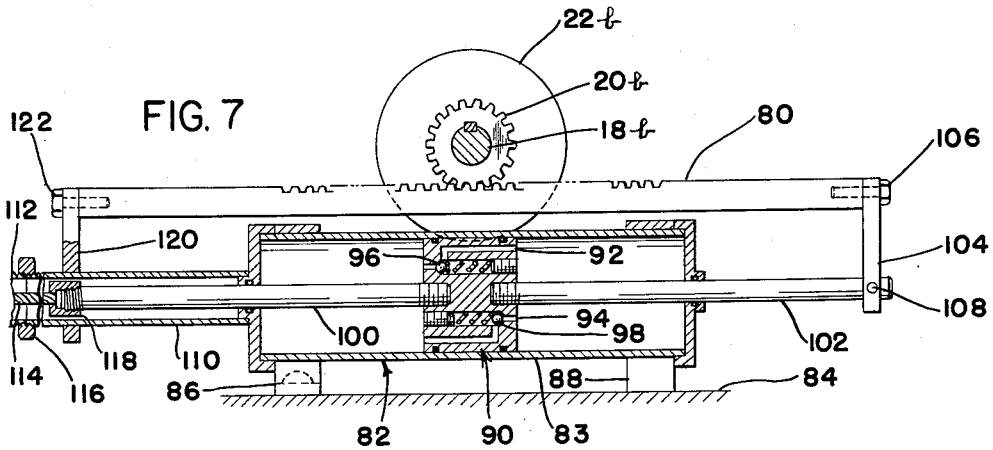

United States Patent Office 3,084,566
Patented Apr. 9, 1963

3,084,566
STEERING DEVICE
John P. Pistillo, 841 Whitcomb Road, Cleveland, Ohio
Filed Apr. 1, 1960, Ser. No. 19,290
6 Claims. (Cl. 74—495)

This invention relates to steering devices for vehicles and particularly to those devices which include means for applying a predetermined amount of drag or resistance to turning of the steering wheel of the vehicle.

Steering devices constructed in accordance with the principles of the invention have been found to produce extremely desirable results when used in connection with power boats and the like. The principles of the invention are also well adapted, however, for use with automotive vehicles.

Conventional steering systems have through the years been found deficient in several respects. Most notable of these deficiencies is the tendency of such conventional steering devices to allow an undesirable degree of transmission of shock loadings from the rudder or motor (in the case of a boat) to the steering wheel, or from the tires to the steering wheel in the case of an automotive vehicle. As a result, whip lash and motor kickback render the vehicle involved difficult to maintain on course and steering of such vehicle is fatiguing due to the transmitted vibrations.

By means of this invention it is proposed to eliminate a number of the undesirable aspects of conventional steering devices through the utilization of means to apply a predetermined amount of drag or resistance to turning to the steering wheel. In this manner it is possible to reduce by a considerable factor the twisting, turning, vibration, whip lash and the like transferred from the motor, rudder or tires (whichever the case may be) to the steering wheel. This greatly increases the ease with which the vehicle involved may be steered and reduces the fatigue incident thereto.

An additional important advantage of a steering device built in accordance with the invention is to be found in the fact that a momentary release of the steering wheel does not result in the vehicle wandering off course. Consequently, a much more positive control is obtained over the vehicle.

It is a general object of the invention to provide a steering device which includes means for applying to the steering wheel a predetermined amount of drag or resistance to turning, thereby to reduce vibrations and the like which would otherwise be transmitted through the steering system to the steering wheel.

It is a further object of the invention to provide, in a device of the type described, means for applying to the steering wheel a predetermined amount of drag and which means include a wall-forming member operable in a hydraulic cylinder or casing associated by means of suitable linkage mechanisms with the steering wheel, the wall-forming member and the casing together forming a pair of variable volume chambers interconnected by suitable valving means.

Another object of the invention is to provide a means of the type described which may be installed as an adjunct to the conventional steering system without the necessity of making major alterations to such system.

It is an even further object of the invention to provide a means for applying to the steering wheel of a vehicle a predetermined drag which means is simple in construction, efficient in operation and durable in use.

In the drawings:

FIG. 6 is a fragmentary view partly in section taken along line 6—6 of FIG. 5;

FIG. 7 is a fragmentary front elevation partly in section of still another modified form of the invention.

Referring now more particularly to the drawings, it will be noted that for purposes of description the invention has been illustrated as being included in a steering device for power boats. The underlying principles of the invention, however, are equally well adapted for use in connection with automotive vehicles.

Figure 1:
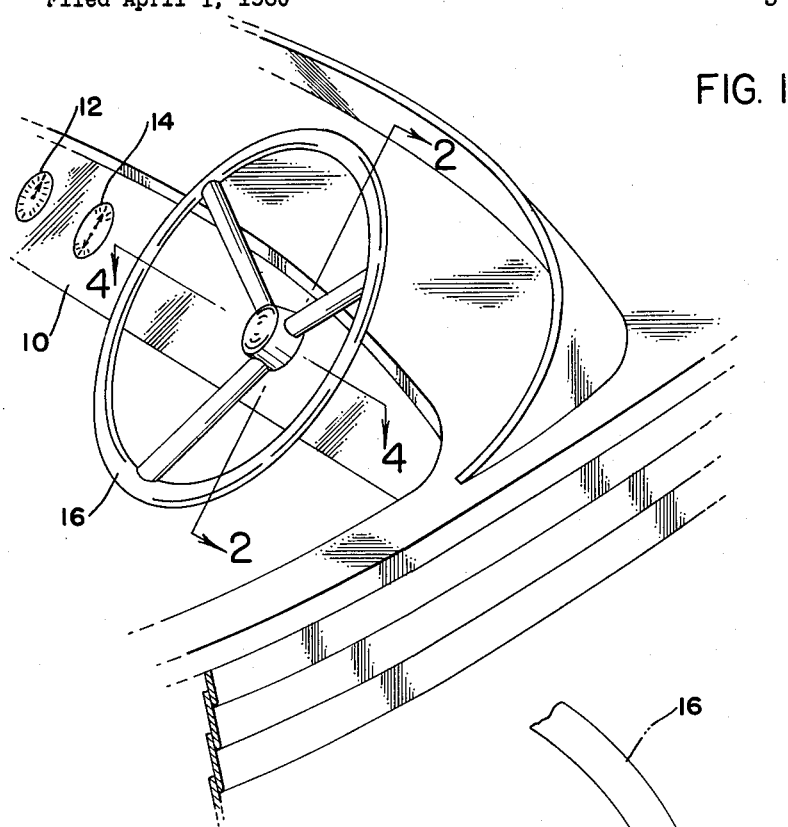
FIG. 1 is a fragmentary perspective view of the cockpit of a boat which embodies the principles of the invention.

In FIG. 1, I have shown a fragmentary view of the cockpit of a boat including an instrument panel 10, suitable indicators 12 and 14 and a steering wheel 16. As seen more particularly in FIG. 2, the wheel 16 is mounted upon a rotatable steering wheel shaft 18. Also mounted upon the shaft 18 are a pinion gear 20 and a cable drum 22. The cable drum is adapted for co-operation with conventional steering cables (not shown) to the motor or rudder (not shown).

A second shaft 24 is spaced laterally from the steering wheel shaft 18 and carries a large idler gear 26 which meshes with the pinion 20. The idler pinion 28 is also mounted on the shaft 24 and rotates with the larger driven gear 26. The pinion 28 meshes with a large gear 30 mounted upon shaft 32 such that rotary movements, suitably reduced, of the steering wheel 16 are transmitted to the large gear 30 through the action of pinion 20, gear 26 and pinion 28.

A hydraulic piston assembly indicated generally at 33 is disposed adjacent the large gear 30 in such a manner that its longitudinal axis substantially intersects the center of the shaft 32. The hydraulic piston assembly 33 is mounted at one end to a suitable portion 36 of the boat frame by means of co-operating brackets 38 and 40 pivotally attached to one another at 42. The assembly includes a housing or casing 34 with a piston head 44 slidably received therein. A piston rod 46 is attached to the piston head 44 and extends axially outwardly of the casing 34 in fluid tight relationship therewith in a direction towards the large gear 30. The piston rod 46 is eccentrically mounted to the large gear 30 on pivot 48 by means of a yoke 50.

A pair of generally Z-shaped flow passageways 48 and 49 extend through the piston head 44. Positioned intermediate the ends of each passageway are conventional spring biased ball check valves 52 and 54, and adjusting screws 56 and 58 are provided for varying the tension in the springs which bias the balls.

Figure 2:
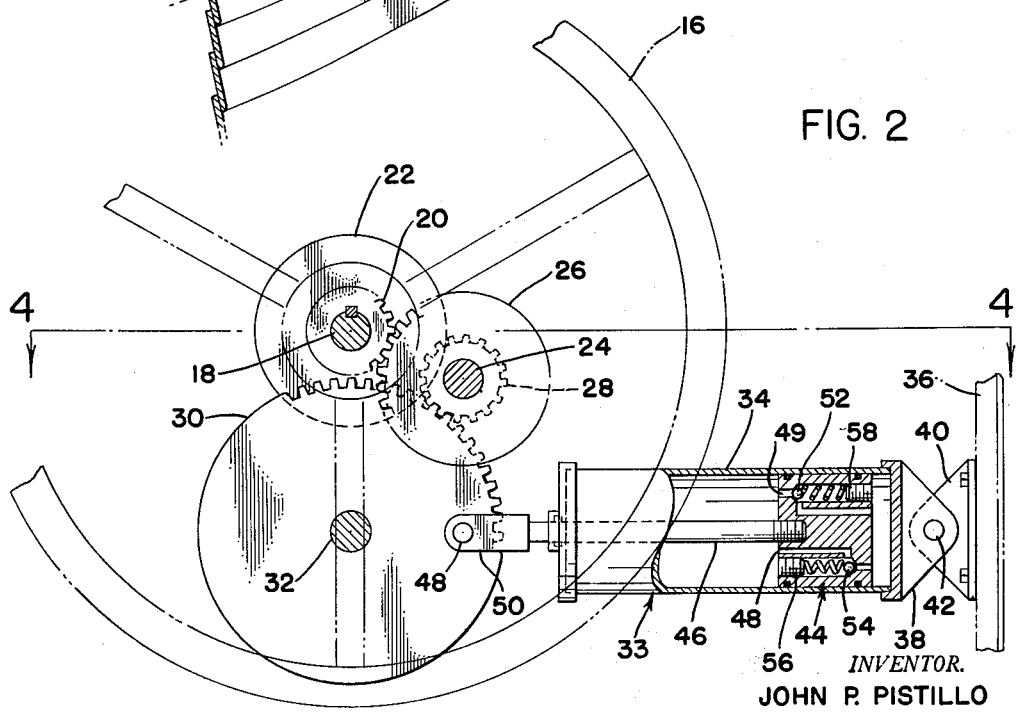
FIG. 2 is an enlarged fragmentary view partly in section taken along line 2—2 of FIG. 1 and shows the position of the various elements when the steering wheel is in neutral position.

It will be observed that the ball check valves 52 and 54 are arranged in such a manner as to act in opposite directions. In other words, ball check valve 52 will allow fluid to pass through flow passageway 49 only in the direction from left to right as seen in FIG. 2, while ball check valve 54 allows flow through flow passageway 48 only from right to left.

It will be readily observed that rotation of the large gear 30, in response to the movements of the steering wheel 16, will cause rotational movement of the hydraulic piston assembly about the pivot 42, in addition to axial movement of the piston rod 46 and the piston head 44 by virtue of the pivotal connection at 48 between the piston rod and the large gear 30. For example, in FIG. 3 the mechanism is illustrated when the steering wheel of the boat is in the right turn position. As will be seen by reference to this figure the clockwise movement of the steering wheel has caused rotation of the hydraulic piston assembly in a counterclockwise direction about pivot 42, and has caused also the longitudinal movement of the piston head 44 in a direction away from such pivot. The pressure exerted by the hydraulic fluid on the left hand face of the piston head 44 has caused the ball check valve 52 to open, thereby to allow flow through passageway 50 of the fluid from the chamber found between the casing and the left-hand face of the piston head to the chamber formed between the casing and the right-hand face of the piston head. The fluid in the chamber defined between the casing and the left-hand face of the piston head, being under compression because of the movement of the piston head 44, exerts a force against the piston which resists the movement thereof. The magnitude of this resistance may be varied within limits to suit the requirements of individual operators by means of the adjusting screws 56 and 58 which in turn control the opening pressure of the ball checks and/or the flow rate of fluids through the flow passageways.

Figure 3:
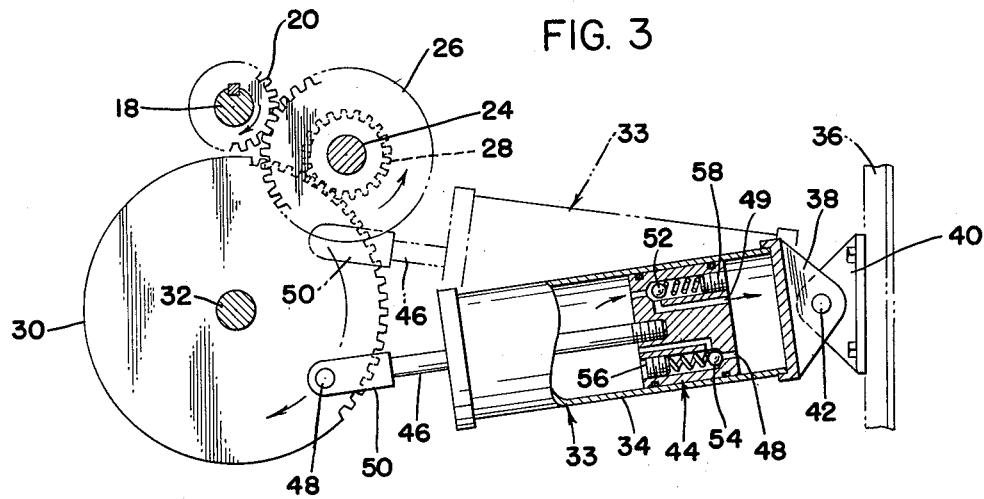
FIG. 3 is a view similar to FIG. 2 showing the position of the various elements when the wheel is in the right turn position.
Figure 4:
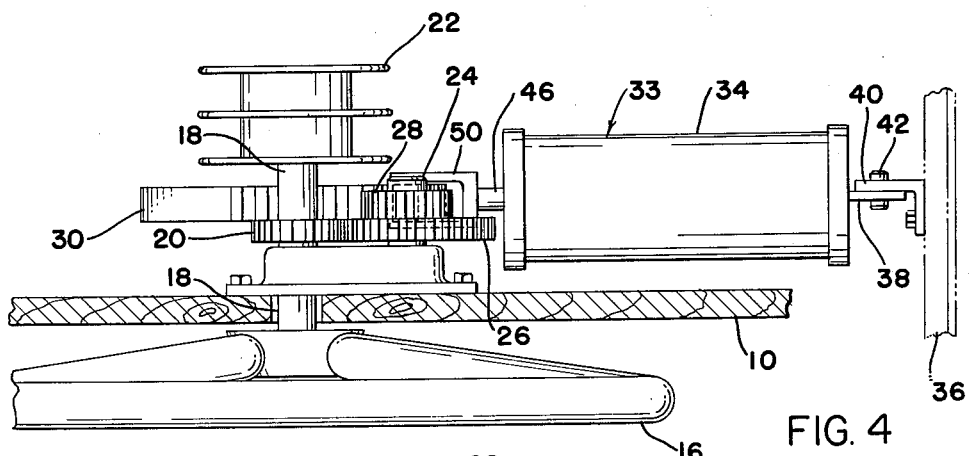
FIG. 4 is an enlarged fragmentary view partly in section taken along line 4—4 of FIGS. 1 and 2.

When the steering wheel is turned to the left, the hydraulic piston assembly will be moved in a clockwise direction to the position indicated in phantom in FIG. 3, the valves operate in the same manner as for a right turn.

In returning the steering device 16 to neutral from right or left turn, movement of the steering wheel will cause the piston head 44 to travel in the direction of the pivot 42 thereby causing the ball check valve 52 to close due to the influence of its spring biasing means and the pressure exerted on the ball check valve 54 by the hydraulic fluid in the chamber defined between the right-hand face of the piston head and the casing passageways will cause such valve to open and allow flow through passageway 48 from such chamber to the chamber defined between the left face of the piston head and the casing. This action imparts a resistance to the motion of the piston head in the direction of the pivot 42 and, consequently, to the rotation of the steering wheel.

Figure 5:
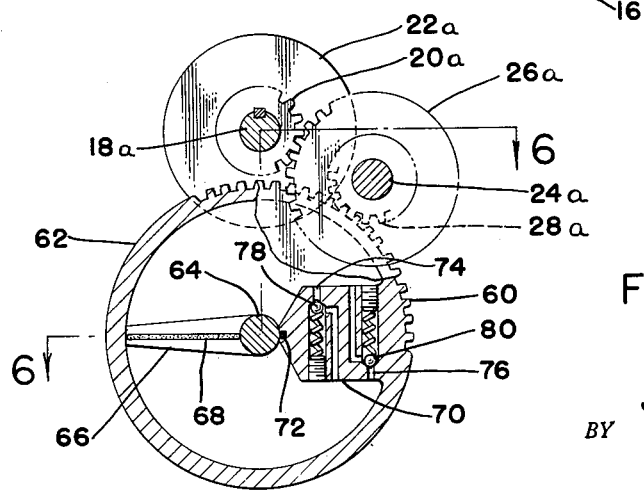
FIG. 5 is a front elevation partly in section of a modified form of the invention.

In FIGS. 5 and 6 I have shown a modified form of the invention. This form of the invention employs a cable drum 22a and a pinion 20a mounted upon the steering wheel shaft 18a. The pinion 20a meshes with a large driven gear 26a which, in turn, drives another small pinion 28a by means of a shaft 24a to which both the gear 26a and the pinion 28a are mounted.

The pinion 28a meshes with a number of gear teeth 60 provided over a portion of the circumference of hollow cylindrical drum or casing 62. The drum 62 is rotatably mounted in sealed relationship on the stationary shaft 64. A wall member 66 is fixedly mounted on the stationary shaft 64 and fits snugly within the drum 62. A sealing member 68 extends around the periphery of the wall member 66 to establish a leak-proof relationship between the edges of the wall and the inside surfaces of rotatable drum 62. A radially inwardly extending partition or vane 70 is formed on the interior circumferential surface of the rotatable drum 62 and slidably contacts the surface of the stationary shaft 64. A suitable sealing member 72 provides for a fluid tight contact between the edge of the partition or vane 70 and the surface of the shaft 64.

A valving arrangement substantially identical to that employed in connection with the embodiment of FIGS. 1 through 4 is provided in the radially inwardly extending partition or vane 70 and includes a pair of generally Z-shaped flow passageways 74 and 76 having positioned therein oppositely acting ball check valves 78 and 80.

Rotation of the steering wheel 16a in a clockwise direction imparts rotational movement to the drum 62 in a clockwise direction by means of the operation of pinions 20a and 28a and larger gear 26a. Such rotation causes a clockwise movement of the partition or vane 70 towards the stationary wall 66 with the result that the hydraulic fluid contained between these two members is compressed, thereby rendering a resistance to the rotation of the drum. The magnitude of this resistance is regulated in the same manner as that described in connection with FIGS. 1 through 4.

Turning now to FIG. 7 I have shown still another modification of the invention. This modification is particularly well suited for interchangeable use in connection with those steering systems employing either a cable in co-operation with a cable drum or in those which employ the well known push-pull cable. The invention as disclosed in FIG. 7 includes a pinion 20b and a cable drum 22b mounted upon the steering wheel shaft 18b. The pinion 20b meshes with a generally horizontally extending rack 80 and when the steering wheel is in a neutral position the rack 80 extends for a substantially equal distance on either side of the vertical center line of the shaft 18b.

Disposed adjacent the rack 80 and in parallel relationship therewith is a stationary hydraulic piston assembly 82 mounted to a portion of the frame 84 of the boat by means of brackets 86 and 88. The hydraulic piston assembly includes a casing or cylinder 83, and received within the cylinder or casing 83 for reciprocation therein is a piston head member 90 provided with flow passageways 92 and 94 and spring biased ball check valves 96 and 98 in the same manner as that described in connection with FIGS. 1 through 4.

In contrast to the embodiment of FIGS. 1 through 4, however, the piston head 90 is provided with a pair of piston rods 100 and 102 which extend in opposite directions along the axis of the casing or cylinder 82 and generally parallel to the rack 80. The piston rod 102 is fixedly connected to the rack 80 by means of a cross member 104 mounted to the rack 80 as by bolt means 106 and to the piston rod 102 as by means of set screw 108.

A tube member 110 is mounted upon one end wall of the cylinder 82 and the piston rod 100 is reciprocally received therein. When used with a steering system using a push-pull cable, the tube 110 is attached to the guide conduit 112 for such cable 114 by means of a coupling sleeve or the like 116. A screw thimble 118 may be employed for connecting the free end of the piston rod to the push-pull steering cable. Cross piece 120, attached to the rack 80 as by a bolt means 122, is slidably received upon tube 110.

It is to be understood that the piston rod 100 will be attached to a push-pull cable only in those instances in which such cable comprises the means by which movement is transferred from the steering wheel of the vehicle to the motor or rudder. In other applications the cable drum 22b will be employed.

In operation, the embodiment of FIG. 7 is quite similar in principle to that of the embodiments previously described. Rotation of the shaft 18b in response to the movements of the steering wheel will cause the translation of the rack 80 by means of the pinion 20b. The translational movements are, in turn, transferred to the piston rod 102 by means of the cross member 104 and thence to the piston head 90. In instances where the particular steering system involved employs a push-pull cable, the movements of the steering wheel are transferred to the cable through the medium of the piston rod 100. In other instances such movements may be transferred by means of the cable drum 22b. The operation of the ball check valves 96 and 98 in response to the pressures exerted by the compression of the hydraulic fluid is the same as that described in connection with the previous embodiments.

From the foregoing description it will be observed that by means of the instant invention it is possible to apply a predetermined amount of drag or resistance to turning to the steering wheel of a vehicle, thereby to measurably improve the ease with which the vehicle may be steered. To the accomplishment of this end, the invention makes use of the resistance forces exerted by the compression of a hydraulic fluid.

For purposes of illustration certain terminology and certain concrete embodiments have been employed in the description of the inventive principles here involved. It will be immediately obvious, however, to one possessing but ordinary skill in the art that a number of departures could be made with respect to the terminology and illustrative embodiments employed without at the same time departing from the true scope of the invention. It is not my intention, therefore, to be limited by the specific illustrative embodiments shown or the descriptive terminology employed, but only by the scope of the appended claims.

I claim:

1. In a steering device having a steering wheel, means to apply a predetermined amount of resistance to the turning of the steering wheel of such device, including a hollow casing member, a wall-forming member snugly fitted in the casing and forming therewith a pair of chambers disposed on opposite sides of the wall-forming member, the wall-forming member being slidable within the casing to increase thereby the volume of one of the chambers while at the same time decreasing the volume of the other, means interconnecting the steering wheel of the device with one of said members for causing relative sliding movement between the wall-forming member and the casing member in response to the rotary movement of said wheel, a pair of flow passageways interconnecting the chambers, each of such passageways having one end thereof in fluid conducting communication with one of the chambers and the other end thereof in fluid conducting communication with the other of the chambers, a check valve positioned intermediate the ends of each passageway, the valve in one of the passageways being arranged to allow flow only in one direction, and the valve in the other of the passageways being arranged to allow flow only in the opposite direction, and hydraulic fluid contained in the pair of chambers.

2. Structure as defined in claim 1 in which the valves provided in the flow passageways are of the spring-biased ball type.

3. Structure as defined in claim 1 in which each valve is provided with means for varying the opening pressure thereof.

4. In a steering device, a manually operable steering means maintained upon a rotatable steering shaft, gear means fixedly mounted on the steering shaft, a hollow casing member connected to the gear means and provided internally thereof with a snugly fitting wall-forming member slidable therein, the casing member and the wall-forming member together defining a pair of chambers disposed on opposite sides of the wall-forming member, means for sliding one of said member, the wall-forming member or the casing member relative to the other in response to the rotation of the gear means whereby to decrease the volume of one of the chambers while increasing the volume of the other, a pair of flow passageways interconnecting the chambers, each passageway being in communication at one end with one of the chambers and at the other end with the other of the chambers, check valve means disposed in each of the passageways and arranged in a manner to allow flow only in one direction through one of the passageways and only in the other direction through the other of the passageways, and hydraulic fluid contained in each of the chambers, whereby the resistance imparted by the compression of the hydraulic fluid by the relative sliding of the wall-forming member and the casing may be transferred to the steering means.

5. Structure as defined in claim 4 in which each flow passageway is generally Z-shaped in longitudinal section with one leg of the Z being the inlet portion of the passageway and the other leg being the outlet portion.

6. Structure as defined in claim 5 in which the check valve means is of the spring biased ball type characterized by the provision of means to adjust the tension of the biasing spring.

References Cited in the file of this patent

UNITED STATES PATENTS

| 1,391,053 | Greiner | Sept. 20, 1921 |
| 2,496,952 | Mercier | Feb. 7, 1950 |
| 2,941,629 | Rohacs | June 21, 1960 |

FOREIGN PATENTS

| 920,709 | Germany | Nov. 29, 1954 |